(12) United States Patent
Libby et al.

(10) Patent No.: US 11,930,358 B2
(45) Date of Patent: Mar. 12, 2024

(54) SEAMLESS HANDOFF BETWEEN WIRELESS ACCESS GATEWAYS

(71) Applicant: Microsoft Technology Licensing, LLC, Redmond, WA (US)

(72) Inventors: Mark Libby, Groton, MA (US); Deepak Garg, Nashua, NH (US); Girish Nair, Nashua, NH (US); Narsi Veldanda, Northboro, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 17/087,788

(22) Filed: Nov. 3, 2020

(65) Prior Publication Data

US 2021/0051476 A1  Feb. 18, 2021

Related U.S. Application Data

(63) Continuation of application No. 15/388,321, filed on Dec. 22, 2016, now abandoned.

(60) Provisional application No. 62/273,625, filed on Dec. 31, 2015.

(51) Int. Cl.

| *H04W 12/06* | (2021.01) |
|---|---|
| *H04L 9/40* | (2022.01) |
| *H04W 12/08* | (2021.01) |
| *H04W 36/00* | (2009.01) |
| *H04W 76/12* | (2018.01) |

(Continued)

(52) U.S. Cl.
CPC .......... *H04W 12/06* (2013.01); *H04L 63/029* (2013.01); *H04W 36/0011* (2013.01); *H04W 76/12* (2018.02); *H04L 63/0281* (2013.01); *H04L 63/0892* (2013.01); *H04W 12/08* (2013.01); *H04W 88/16* (2013.01); *H04W 92/22* (2013.01)

(58) Field of Classification Search
CPC . H04W 12/06; H04W 76/12; H04W 36/0011; H04W 12/08; H04W 88/16; H04W 92/22; H04L 63/029; H04L 63/0281; H04L 63/0892
USPC ............................................................ 726/4
See application file for complete search history.

(56) References Cited

U.S. PATENT DOCUMENTS

| 2006/0104233 A1* | 5/2006 | Zhang | H04L 63/0272 |
|---|---|---|---|
| | | | 370/328 |
| 2008/0057906 A1* | 3/2008 | Lee | H04L 63/0892 |
| | | | 455/411 |

(Continued)

*Primary Examiner* — Moeen Khan
(74) *Attorney, Agent, or Firm* — Ray Quinney & Nebeker; James Bullough

(57) ABSTRACT

A method of data communication includes receiving, by a first wireless access gateway (WAG), at least a first data packet corresponding to a first data flow transmitted from user equipment (UE) and receiving, by a second WAG, at least a second data packet transmitted from the UE. In response to receiving the second data packet, the second WAG determines an identity of the first WAG, and in response to determining the identity of the first WAG, the method includes establishing a tunnel connection between the first WAG and the second WAG. After establishing the tunnel connection, the method includes receiving by the second WAG at least a third data packet corresponding to the first data flow transmitted from the UE, and the second WAG transmits to the first WAG, via the tunnel connection, the third data packet.

20 Claims, 10 Drawing Sheets

(51) Int. Cl.
*H04W 88/16* (2009.01)
*H04W 92/22* (2009.01)

(56) References Cited

U.S. PATENT DOCUMENTS

| | | | |
|---|---|---|---|
| 2008/0219218 A1* | 9/2008 | Rydnell | H04W 92/02 370/331 |
| 2013/0070596 A1* | 3/2013 | Yeh | H04W 76/22 370/235 |
| 2013/0288644 A1* | 10/2013 | Schroeder | H04W 12/062 455/411 |
| 2013/0326631 A1* | 12/2013 | Cartmell | H04W 12/80 726/26 |
| 2014/0293882 A1* | 10/2014 | Choi | H04W 76/22 370/329 |
| 2015/0373617 A1* | 12/2015 | Cho | H04W 40/12 370/329 |

\* cited by examiner

SEAMLESS HANDOFF BETWEEN WIRELESS ACCESS GATEWAYS

CROSS-REFERENCE TO RELATED APPLICATIONS

This application is a continuation of U.S. patent application Ser. No. 15/388,321 (the '321 Application), filed Dec. 22, 2016. The '321 Application claims priority to U.S. Provisional Patent Application No. 62/273,625, filed Dec. 31, 2015. Each of the aforementioned is expressly incorporated by reference in its entirety.

FIELD OF INVENTION

The invention generally relates to wireless access gateways and, in particular, to the use of wireless access gateways as part of mobile communications systems.

BACKGROUND

Wireless Access Gateways ("WAGs") are a critical component of the Evolved Packet Core ("EPC") non-3GPP network access architectures. Wireless Authentication, Authorization and Accounting AAA Proxies ("WAPs") can be used in conjunction with WAGs to authenticate user equipment ("UE") prior to granting connectivity.

SUMMARY

One aspect of the invention includes techniques and systems for seamless handoff between wireless access gateways.

Under another aspect of the invention, a method of data communication includes receiving, by a first wireless access gateway (WAG), at least a first data packet corresponding to a first data flow transmitted from user equipment (UE) and receiving, by a second WAG, at least a second data packet transmitted from the UE. In response to receiving the second data packet, the second WAG determines an identity of the first WAG, and in response to determining the identity of the first WAG, the method includes establishing a tunnel connection between the first WAG and the second WAG. After establishing the tunnel connection, the method includes receiving by the second WAG at least a third data packet corresponding to the first data flow transmitted from the UE, and the second WAG transmits to the first WAG, via the tunnel connection, the third data packet.

In one embodiment, the second data packet corresponds to the first data flow.

In another embodiment, the second data packet corresponds to a request by the UE for confirmation that an Internet Protocol (IP) address presently assigned to the UE may still be used to conduct the first data flow.

In a further embodiment, the method also includes the second WAG transmitting a response to the UE request for confirmation, the response comprising confirmation that the UE may continue to use the IP address presently assigned to the UE.

In still another embodiment, the tunnel connection comprises a GPRS Tunneling Protocol (GTP) tunnel.

In another embodiment, the method also includes receiving, at the first WAG, at least a fourth data packet corresponding to the first data flow intended for the UE, the first WAG transmitting the received fourth data packet to the second WAG via the tunnel connection, and the second WAG transmitting the fourth data packet to the UE.

In still another embodiment, the fourth data packet is transmitted by an origin server, and the method further include the first WAG performing a network address translation operation on the fourth data packet before transmitting the fourth data packet to the second WAG.

In a further embodiment, the method further includes transmitting user data associated with the UE via the tunnel connection.

In one embodiment, the method also includes the second WAG inspecting the second data packet to determine whether the second data packet is part of an existing data flow or part of a new data flow.

In another embodiment, the second WAG determining the identity of the first WAG includes the second WAG receiving the identity of the first WAG from a Wireless Authentication, Authorization, and Accounting Proxy (WAP).

In a further embodiment, the second WAG receiving the identity of the first WAG from the WAP is in response to the second WAG requesting the identity of the first WAG in response to the second WAG receiving the second data packet.

In still a further embodiment, the second WAG receiving the identity of the first WAG from the WAP is in response to the UE transmitting a re-authentication request to the WAP.

In an embodiment, the second WAG determining the identity of the first WAG includes inspecting the IP address of the UE and determining the identity of the first WAG based on the IP address of the UE.

In another embodiment, the method also includes receiving by the second WAG at least a fourth data packet corresponding to a second data flow transmitted from the UE, and the second WAG transmitting the fourth data packet to a computer system while bypassing the tunnel connection.

Under another aspect of the invention, a method of data communication includes receiving by a first WAG at least a first data packet corresponding to a first data flow transmitted by a computer system intended for a UE. The method also includes the first WAG transmitting the first data packet to the UE and the first WAG determining an identity of a second WAG. In response to determining the identity of the second WAG, the method includes establishing a tunnel connection between the first WAG and the second WAG. After establishing the tunnel connection, the method includes receiving by the first WAG at least a second data packet corresponding to the first data flow transmitted by the computer system intended for the UE, the first WAG transmitting to the second WAG, via the tunnel connection, the second data packet, and the second WAG transmitting the second data packet to the UE.

In one embodiment, the first WAG determining an identity of the second WAG is in response to determining that the UE is inaccessible via the first WAG.

In another embodiment, the first WAG determining the identity of the second WAG includes the first WAG receiving the identity of the second WAG from a Wireless Authentication, Authorization, and Accounting Proxy (WAP).

In a further embodiment, the first WAG receiving the identity of the second WAG from the WAP is in response to the first WAG requesting the identity of the second WAG.

In yet another embodiment, the first WAG receiving the identity of the second WAG from the WAP is in response to the UE transmitting a re-authentication request to the WAP.

Under a further aspect of the invention, a method of selectively routing data communications includes providing a WAG with network connectivity to a wireless operator network and a packet data network, wherein the packet data network resides outside of the wireless operator network.

The method also includes receiving by the WAG a first data packet intended for a first computer system included in the wireless operator network and selectively routing the first data packet to the first computer system via the wireless operator network. The method also includes receiving by the WAG a second data packet intended for a second computer system included in the packet data network and selectively routing the second data packet to the second computer system via the packet data network while bypassing the wireless operator network.

In an embodiment, the selectively routing the first data packet to the first computer system includes basing the selection on at least one of a source Internet Protocol (IP) address, a source User Datagram Protocol/Transmission Control Protocol (UDP/TCP) port, a destination IP address, a destination UDP/TCP port, and a traffic type of the first data packet.

In another embodiment, the selectively routing the second data packet to the second computer system includes basing the selection on at least one of a source Internet Protocol (IP) address, a source User Datagram Protocol/Transmission Control Protocol (UDP/TCP) port, a destination IP address, a destination UDP/TCP port, and a traffic type of the second data packet.

In a further embodiment, the selectively routing the first data packet to the first computer system includes routing the first data packet via a GPRS Tunneling Protocol (GTP) tunnel to the wireless operator network.

Under an aspect of the invention, a system for data communications includes a first WAG and a second WAG, each WAG having a processor and machine readable instructions that cause the processors of the WAGs to perform any of the aspects and embodiments set forth above.

Under a further aspect of the invention, a WAG for selectively routing data communications includes a first network interface to a wireless operator network, a second network interface to a packet data network, wherein the packet data network resides outside of the wireless operator network, and a processor. The WAG also includes machine readable instructions that when executed cause the processor to receive a first data packet intended for a first computer system included in the wireless operator network and selectively route the first data packet to the first computer system via the wireless operator network. The instructions also cause the processor to receive a second data packet intended for a second computer system included in the packet data network and selectively route the second data packet to the second computer system via the packet data network while bypassing the wireless operator network.

Any of the above aspects or embodiments can be combined with any other aspects or embodiments set forth above or otherwise herein.

BRIEF DESCRIPTION OF THE DRAWINGS

For a more complete understanding of various embodiments of the disclosed subject matter, reference is now made to the following descriptions taken in connection with the accompanying drawings, in which.

DETAILED DESCRIPTION

Figure 1:
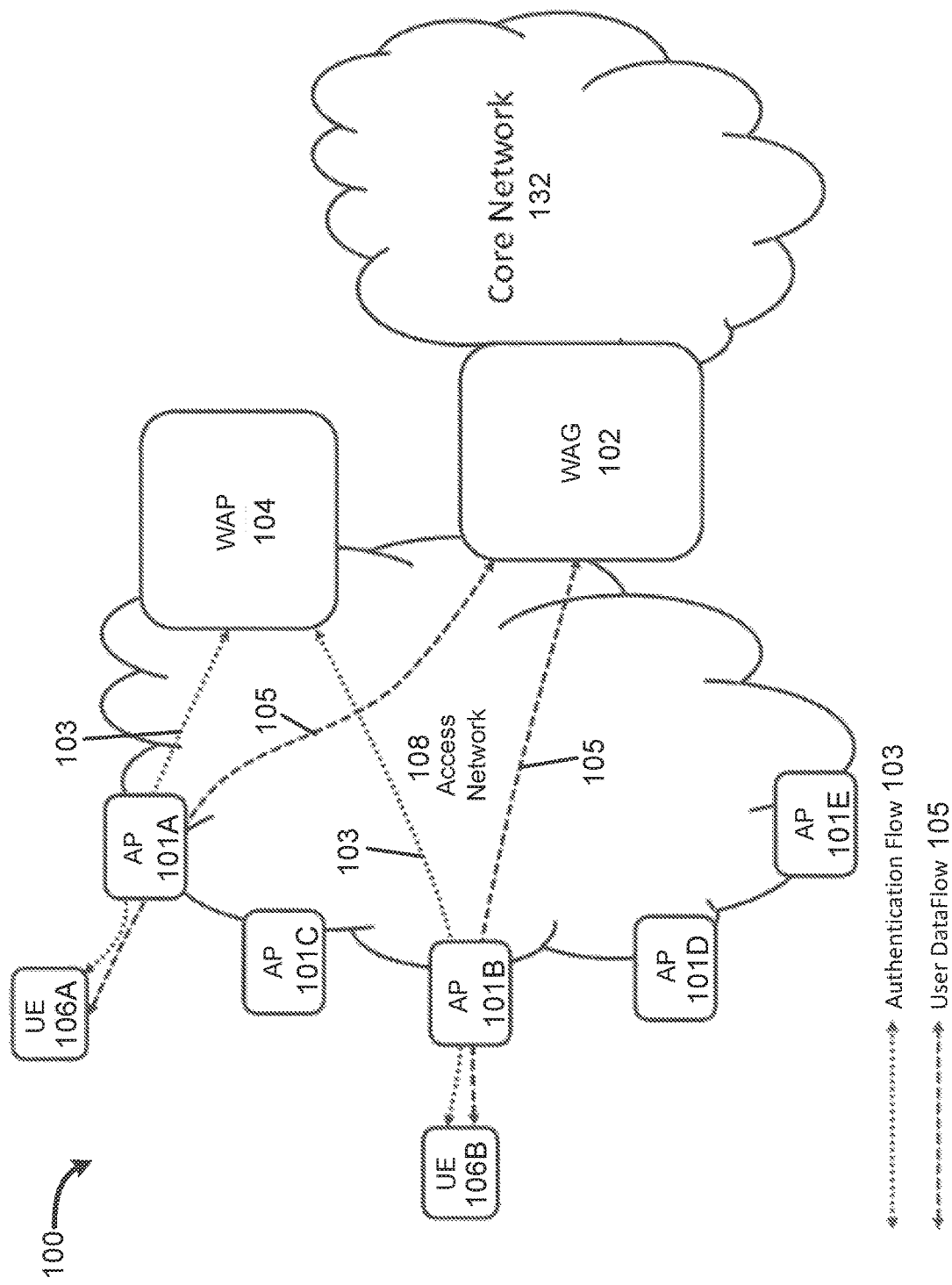
FIG. 1 is a diagram illustrating wireless access, in which a WAP authenticates a UE, and UE data is forwarded between an access network and a core network via a WAG, in accordance with some embodiments of the disclosed subject matter.

Some embodiments described herein relate to mechanisms to facilitate UE mobility across Attachment Points ("APs") and Wireless Access Gateways ("WAGs") of a WiFi network without requiring the release of the IP address allocated to the UE for purposes of IP offload, and without requiring any action by the user equipment ("UE") to facilitate IP address preservation. This provides a much more seamless user experience compared with previous methods, for example since IP flows remain intact regardless of the AP used to provide access to the core network, and regardless of whether the WAG is forced to change due to the change in AP. As used herein, the term "core network" refers to the central part of a mobile network to which the WAG provides direct connectivity. A core network is typically comprised of a collection of interconnected IP routers, and uses a routing protocol, such as Open Shortest Path First ("OSPF") or Border Gateway Protocol ("BGP"), to exchange routing information amongst the routers.

A WAG can provide direct connectivity between a UE, connected via a variety of access technologies, and services located over an Internet Protocol ("IP")-based network. A WAG can also provide UE access to the EPC or 3G Packet Data Services for 3GPP-based services. Examples of UEs include, but are not limited to, 3G and 4G smartphones, tablets, and laptop computers. Along with a Wireless Authentication, Authorization and Accounting AAA Proxy (WAP), UEs can be authenticated and, based upon provisioning and/or subscriber subscription information, are provided IP-based connectivity directly to the Internet (IP offload outside of the core network) or via the EPC (e.g., the Packet Data Network Gateway, "PDNGW") or Global System for Mobile Communications ("GSM") Packet Data Services (e.g., the General Packet Radio Service ("GPRS") Support Node, "GGSN").

Implementations of the present disclosure include mechanisms in which the first WAG that hosts a UE will allocate an IP address to the UE and become the anchor point ("anchoring WAG") for one or more data flows, or "traffic," originating from and/or destined to the UE. If the UE moves, and a new WAG ("hosting WAG") is selected, a mechanism is described in which the hosting WAG learns about the anchoring WAG and requests that data corresponding to the already-initiated data flows be forwarded to the hosting WAG on its return path. This ensures that all data flows that were established by the UE via the anchoring WAG prior to the UE's movement continue to be routed through the anchoring WAG (via the hosting WAG) once the UE has moved. In this fashion, the IP address used by the UE does not change, resulting in a reduction in, or elimination of, disruption of service to the UE due to loss of IP flows.

In some embodiments, when a UE has moved to a new, hosting WAG from the initial anchoring WAG, and all data flows that involved the anchoring WAG have terminated, the hosting WAG may cease to communicate with the anchoring WAG, and may itself become a new anchoring WAG for that UE going forward.

In some embodiments, a seamless handoff method includes initial UE connection to the core network, mobility events and anchoring WAG identification, forwarding tunnel setup, and UE Data forwarding, as described in more detail below.

Initial UE Connection to a Core Network

The initial connection of a UE to a core network (and associated services) is described below, and is generally known to one having ordinary skill in the art. A UE is typically first authenticated and, once successfully authenticated, has data plane resources allocated to it. Two entities work together to accomplish this: the WAP and the WAG. FIG. 1 is a diagram illustrating an example wireless access method 100, in which a WAP 104 authenticates UEs 106A and 106B along authentication flows (103), and UE data is forwarded between an access network 108 and a core network 132 via a WAG 102, along user data flows (105). Each of UE 106A and UE 106B access the access network 108 via a corresponding AP (101A and 101B, respectively) of a plurality of available APs (APs 101A through 101E).

Figure 2:
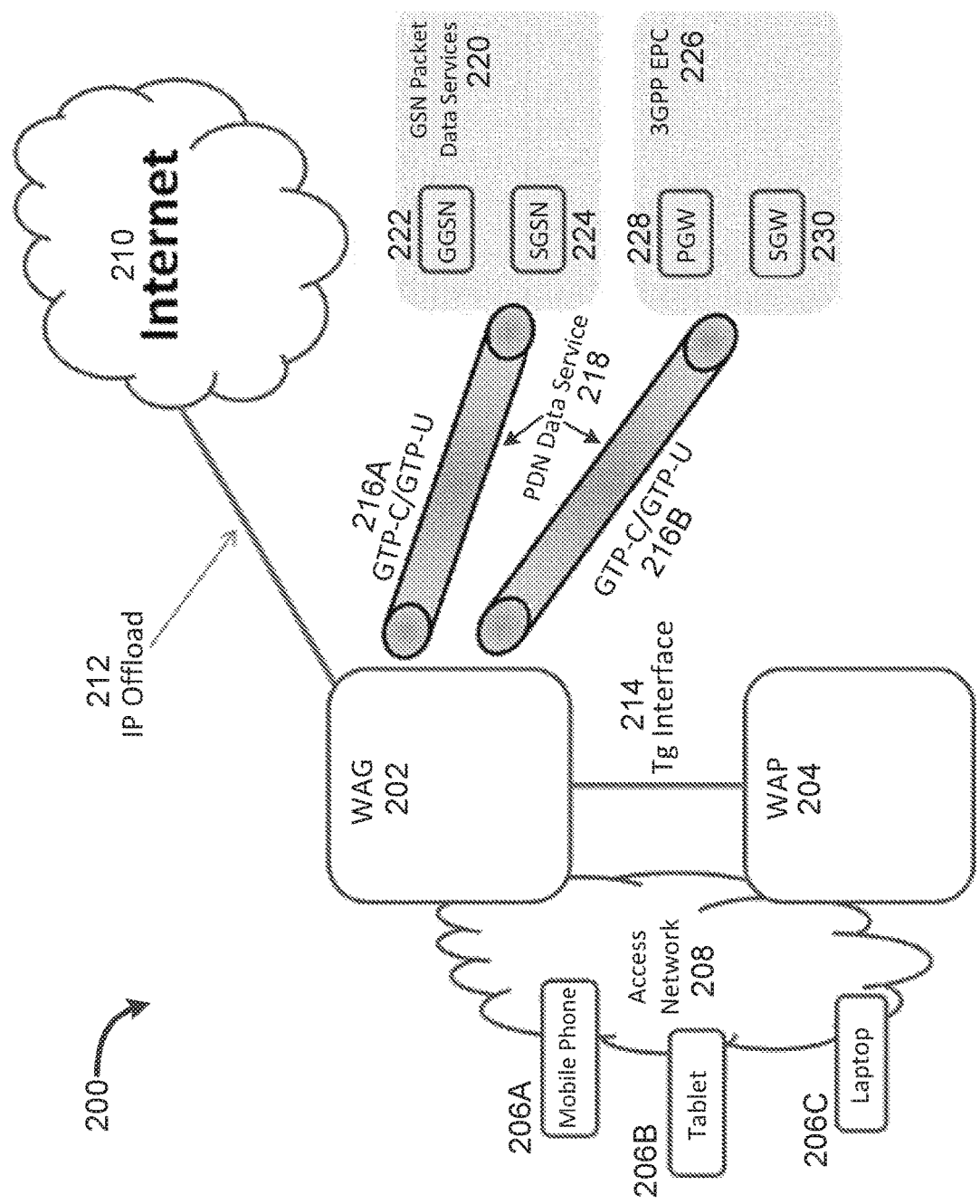
FIG. 2 is a diagram showing wireless access, between a UE on the access side and network services on the core side, via a Wireless Access Gateway ("WAG").

FIG. 2 illustrates wireless access between a UE (e.g., a mobile phone 206A, a tablet 206B, a laptop 206C, and/or the like) on the access side and network services on the core side via a WAG 202. The WAP 204 and the WAG 202 work together to authenticate and allocate resources for a UE as it connects to core network services (i.e., GSN packet data services, such as subscriber management, internet services, and other services hosted by the operator, and/or 3GPP EPC services, such as visual voicemail). In some configurations, the WAP is responsible for authenticating and collecting information about the UE, while the WAG is responsible for allocating data plane resources based upon the results of authentication. There is an interface between the WAP 204 and the WAG 202 (Tg interface 214) through which detailed data about the UE can be exchanged, such as authentication state, data plane characteristics, and UE permissions. Once connected, all data originating from, and destined for, the UE traverses the specific WAG 202 hosting the IP address allocated to the UE (206A, 206B, or 206C). Data packets destined for the internet 210 are IP offloaded (212) by the WAG 202. Data packets destined for the core network can be tunneled (216A) via a GPRS Tunneling Protocol (GTP) tunnel to GSN Packet Data Service 220, or tunneled (216B) via a GTP-C/GTP-U tunnel to a 3GPP EPC 226 by the WAG 202. The GSN Packet Data Services 220 includes a gateway GPS support node ("GGSN") 222, which provides internet-working between the GPRS network and external packet switched networks; and a serving GPRS support node ("SGSN") 224, which is responsible for the delivery of data packets from and to mobile stations within its geographical service area. The 3GPP EPC 226 includes a packet data network gateway ("PGW") 228, which provides connectivity from the UE (206A, 206B or 206C) to external packet data networks by being the point of exit and entry of traffic for the UE; and a serving gateway ("SGW") 230, which routes and forwards user data packets. For purposes of this description, the WAG on which the UE data flow is initiated (and that allocates the IP address used by the UE for the corresponding data flow) is called the "anchoring WAG," and the WAG that is currently hosting the UE is called the "hosting WAG."

In some existing communications architectures, a UE decides whether to use the LTE radio or the WiFi radio based on the type of request the UE is making. For example, the UE may use the LTE radio when it is requesting a service that is provided by an operator network (e.g., voice services, visual voicemail, etc.), and the UE may use WiFi when it is requesting a service that is outside of the operator network (e.g., Netflix, and internet browser, etc.). Even in scenarios in which only a WiFi connection through a WAG was available, the WAG routes traffic either entirely through the operator network or entire through a network outside of the operator network (e.g., the internet). Unlike such existing methods, which are based on intervention by a UE, embodiments of the present disclosure include selective IP offload being performed entirely by the WAG.

Figure 3:
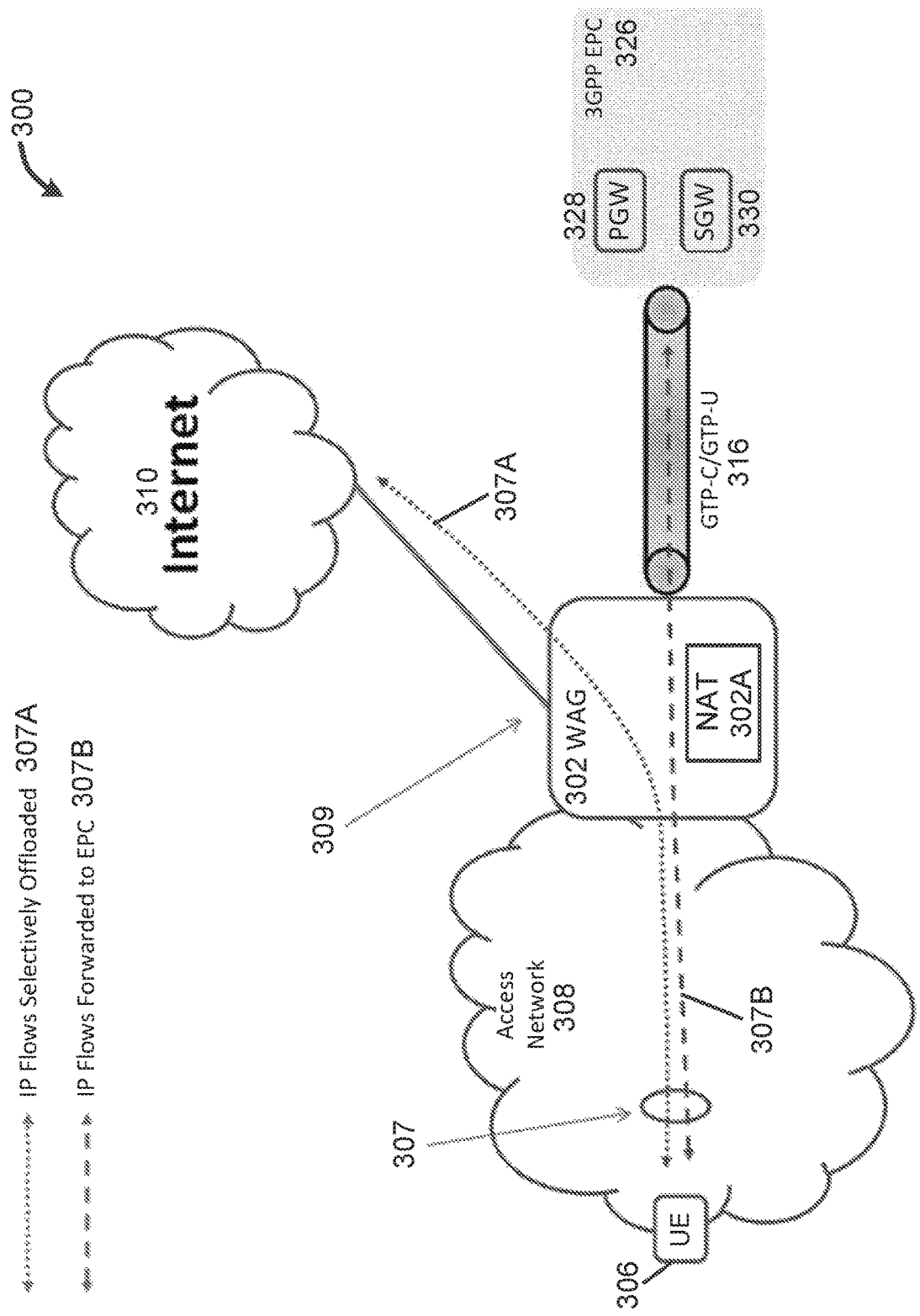
FIG. 3 is a diagram showing selectively offloaded IP flows.

In some embodiments, WAG-driven selective IP offload, shown in FIG. 3, is performed, in which specific IP flows (e.g., identified by source IP address, source User Datagram Protocol/Transmission Control Protocol ("UDP/TCP") port, destination IP address, and/or destination UDP/TCP port) are offloaded by the WAG while other flows between the same two IP addresses are directed to the EPC or GSM Packet Data Services. In the selective IP offload mode, Network Address Translation (NAT) is used to allocate a WAG-hosted IP address to be used for the UE data sent to the Internet 310. This assures that selectively offloaded flows are directed back to the WAG by the server/computer system residing in the Internet 310 (and not to the EPC or GSM Packet Data Services entity, for example). The WAG performs selective IP offload, for example, based on a destination IP address of a received packet (analyzed in Layer 3 or Layer 4 of the OSI Stack), or based on a traffic type (e.g., Skype, YouTube, voice, video, etc.) of a received packet (performed in a Layer 7 analysis). In other words, the WAG can determine whether to send a received packet directly to the EPC 326 or via to the internet 310, bypassing the EPC 326, based on attributes of the packet and/or the other factors mentioned above.

As shown in the process 300 of FIG. 3, UE IP Data 307 between the same source and destination IP addresses flows along one of two paths (307A, 307B)—the smaller dashed line (307A) corresponding to selectively offloaded IP flows, and the larger dashed line (307B) corresponding to IP flows that are forwarded to the 3GPP EPC 326. The data flows emanate from UE 306 and both pass through access network 308 before reaching the WAG 302 where the selective offload takes place. Selectively offloaded flows are sent from the WAG 302 to the internet 310, at 309, a WAG-hosted IP address for the selectively offloaded IP flows is allocated by a NAT (302A) of the WAG 302. Data flows that are not selectively offloaded are forwarded to the 3GPP EPC 326 via GTP-C/GTP-U tunnel 316. The 3GPP EPC 326 includes a PGW 328, which provides connectivity from the UE 306 to external packet data networks by being the point of exit and entry of traffic for the UE 306; and an SGW 330, which routes and forwards user data packets.

Figure 4:
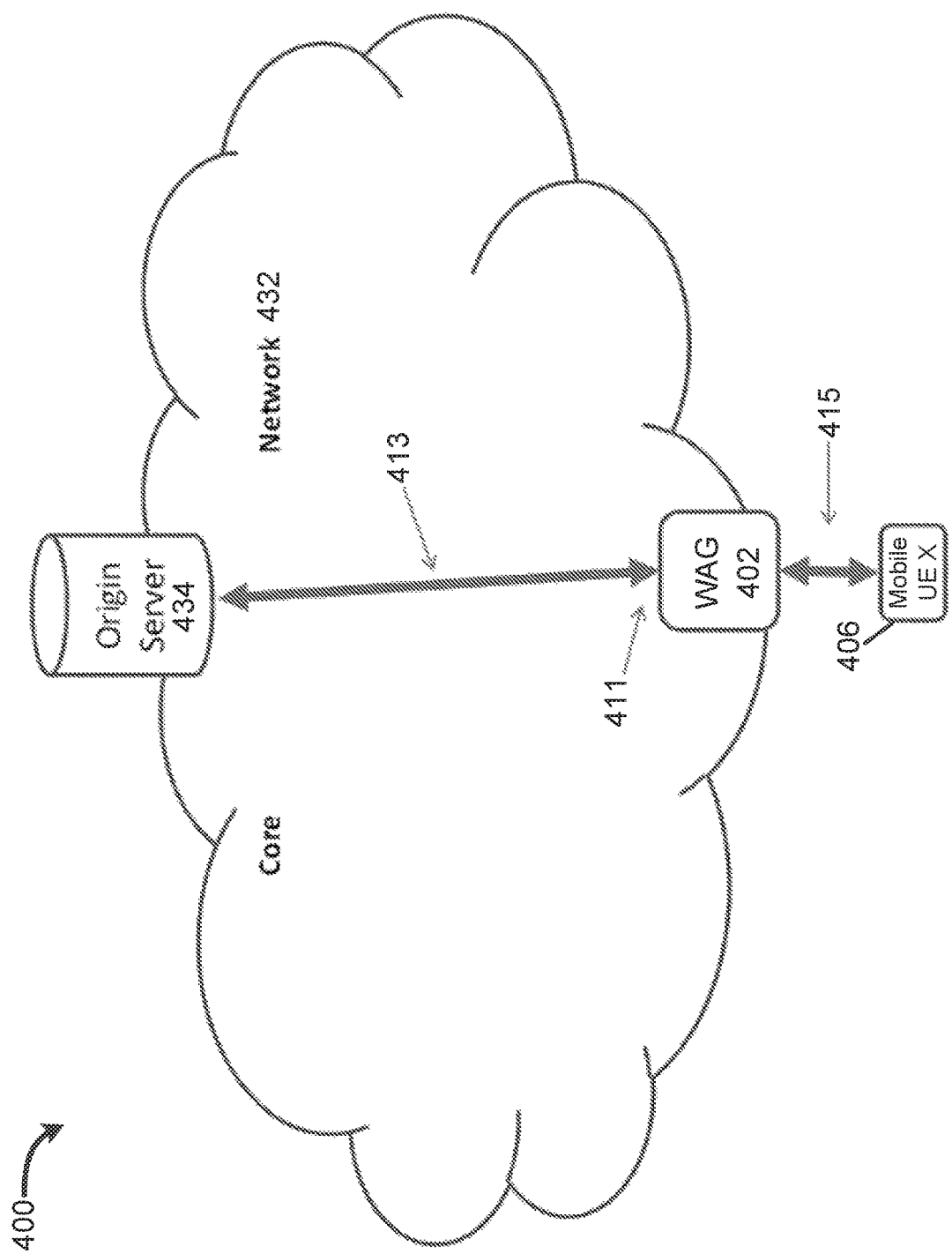
FIG. 4 is a diagram of a WAG data flow between a UE and an origin server, showing IP address allocation and the anchoring point.

FIG. 4 is Wireless Access Gateway data flow 400 between a mobile UE 406 and an origin server 434, via an IP-based core network 432, showing IP address allocation and anchoring point. At 415, the UE 406 connects to the WAG 402 over an access network. To provide IP connectivity, the WAG 402 can allocate and provide to the UE 406 a full host IP address that can be used to direct traffic towards the specific UE 406. For example, at 411, a UE IP address X.X.X.X is allocated to the UE 406 and anchored at the WAG 402, such that all data destined for X.X.X.X is routed to the WAG 402 and then forwarded to the mobile UE 406 over the access network. From the core network 432's perspective, the WAG 402 is the owner of the full host IP address. IP data from the origin server 434 that is sent to the IP address (X.X.X.X) of the UE 406 will arrive at the WAG 402 hosting the UE 406, and is forwarded to the UE 406 via the access network. At 413, data is exchanged between UE 406 (X.X.X.X) and origin server 434 over the core network 432.

Full host IP addresses are typically static in nature, in that the device providing connectivity to the address (in this case, the WAG) does not change. This is due to the latency and difficulty of updating routing tables throughout the core network as well as the hierarchical nature of routing tables in which core routers do not have routing entries for each and every full user IP address. It is undesirable, impractical, and unworkable, to force core networks of many thousands of devices to know and adjust to host IP addresses that move.

UEs gain access to core network services using a variety of access technologies. The technologies may include, but are not limited to, Wi-Fi hotspots, LTE macro-cells, and FEMTO Cells. For purposes of this description, the generic term Attachment Point ("AP") is used to describe the point of attachment for a UE to an access network.

One common characteristic of a UE is mobility. As people move about, the geographical location of the AP that serves the UE's access to the WAG may change. As a result, the WAG used to provide IP connectivity to the core network may change as well due to operator preference, geographic constraints, or one or more other factors. Given the characteristic described above that full host IP addresses do not move from one device to another, if the WAG changes, the IP address allocated to and used by the UE changes as well. This is an undesirable characteristic of existing architectures, since releasing an IP address and re-allocating one results in the disconnection of all IP flows using the old IP address. For example, if the user is in the middle of a video chat, the video chat would disconnect or suffer a long delay when the IP address is released and before the new IP address is allocated. This behavior is undesirable, both from a consumer perspective as well as from a provider perspective.

Figure 5:
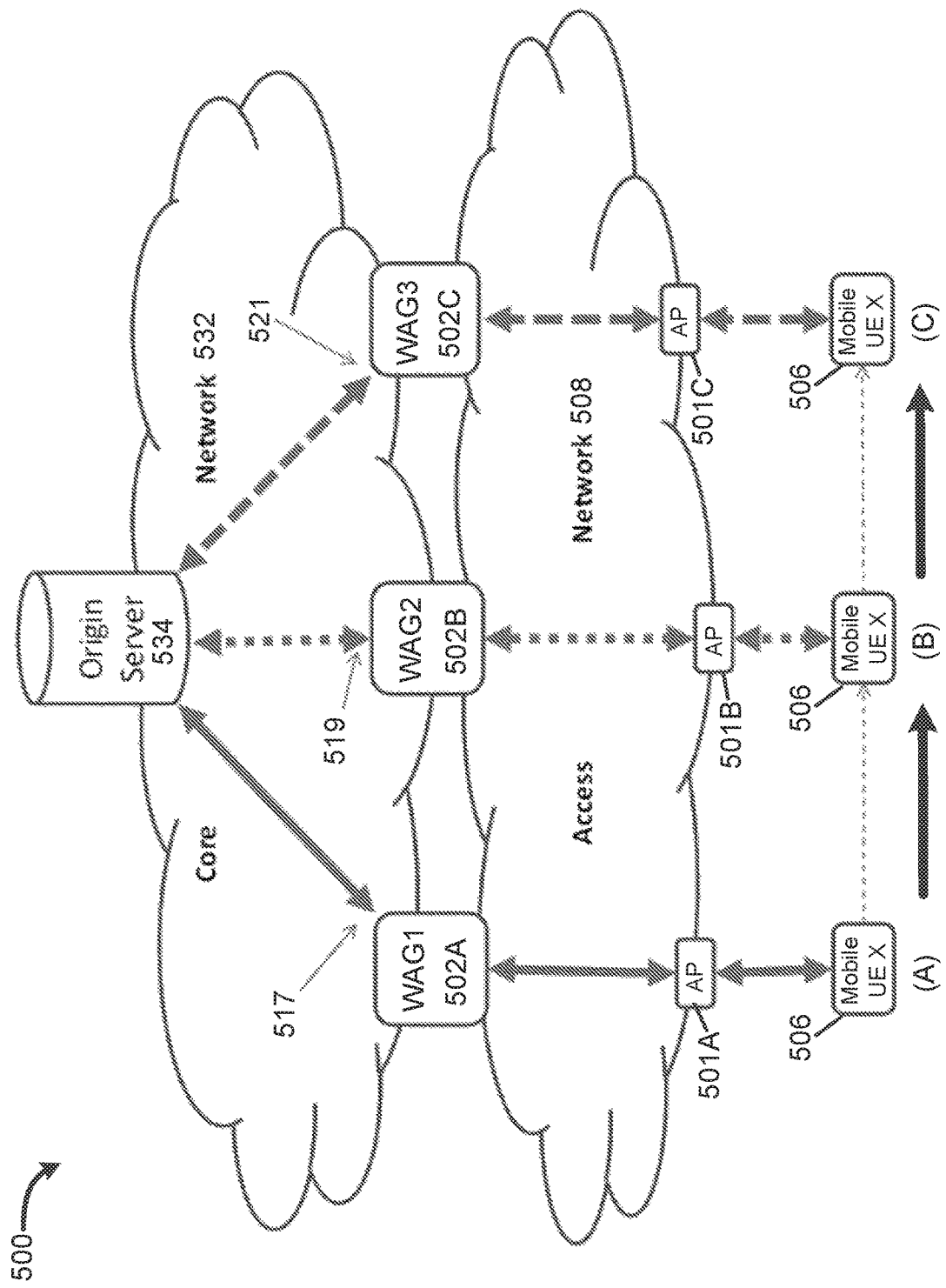
FIG. 5 is a diagram illustrating the disruption of service that can occur when a UE moves from one Attachment Point ("AP")/WAG to another, where the IP address is forced to change as the anchor point changes.

FIG. 5 illustrates a prior art scenario in which a UE (506) moves from one AP/WAG to another, and the IP Address anchor point is forced to move as well. As shown in FIG. 5, mobile UE 506 connects (at a first time and at a first location "A") to AP 501A, which is in communication with WAG1 502A via access network 508. WAG1 502A, in turn, communicates with an origin server 534 via a core network 532. At 517, an IP address X.X.X.X is allocated to the UE 506A by WAG1 502A.

Later, the UE 506 moves and connects (at a second time and at a second location, "B") to AP 501B, which is in communication with WAG2 502B via the access network 508. WAG2 502B, in turn, communicates with the origin server 534 via the core network 532. At 519, a new IP address, Y.Y.Y.Y, is allocated to the mobile UE 506 by WAG2. Still later, the UE 506 moves again, and connects (at a third time and at a third location, "C") to AP 501C, which is in communication with WAG3 502C via the access network 508. WAG3 502C, in turn, communicates with the origin server 534 via the core network 532. At 521, yet another IP address, Z.Z.Z.Z, is allocated to the mobile UE 506 by WAG3. Data flows established between the UE 506 and the first access point 501A may be terminated after the UE 506 moves to location B. Similarly, data flows established between the UE 506 and the second access point 501B may be terminated after the UE 506 moves to location C. Thus, in the prior art, this results in a disruption of service as the IP address is forced to change as the anchor point changes.

Mobility Events & Anchoring WAG Identification

Embodiments of the invention use techniques known in the art for a UE to detect mobility, select a new AP, and subsequently select a new WAG. Once mobility/movement has taken place, the UE will attempt to re-confirm its connectivity to core network resources. For example, when a UE detects a WAG (which may be an anchoring WAG or a hosting WAG) over WiFi, the UE can request an IP address. Mechanisms for reconfirming connectivity to core network resources can vary from UE to UE. They include, but are not limited to: re-authenticating with the WAP, sending a Dynamic Host Configuration Protocol ("DHCP") Confirm message to the WAG, or sending a Neighbor Solicitation to the WAG. The UE behavior does not need to change regardless of whether the WAG supports the IP address preservation techniques disclosed herein or not—it is the result of the confirmation request that indicates to the UE whether it can continue to use the existing IP address or whether it should request a new IP address.

In some embodiments, when a hosting WAG determines that a UE is attempting to reconfirm its core network connectivity and it is not the anchoring WAG for the UE, it attempts to determine the identity of the anchoring WAG. This determination can be made, for example, when the WAG inspects an incoming data packet and recognizes that it is receiving the data "mid-stream," and thus that the subscriber is new. Several approaches for determining the identity of an anchoring WAG are set forth herein. In one approach, the WAP indicates to the hosting WAG the IP address of the anchoring WAG. This information may be pushed to the hosting WAG by the WAP when the UE re-authenticates with the WAP, or it may be requested by the hosting WAG from the WAP when the UE attempts to reconfirm its IP address with the WAG. In another approach, the hosting WAG uses local configuration data and the UE's IP address to determine the IP address of the anchoring WAG, for example by recognizing that the UE's IP address falls within a pre-allocated range (which may be hierarchically ordered) that correlates with an anchoring WAG. In still a further approach, a deep packet inspection is performed on the traffic being attempted by the UE, and it is discovered that the packets are within a series of packets already exchanged.

Figure 6:
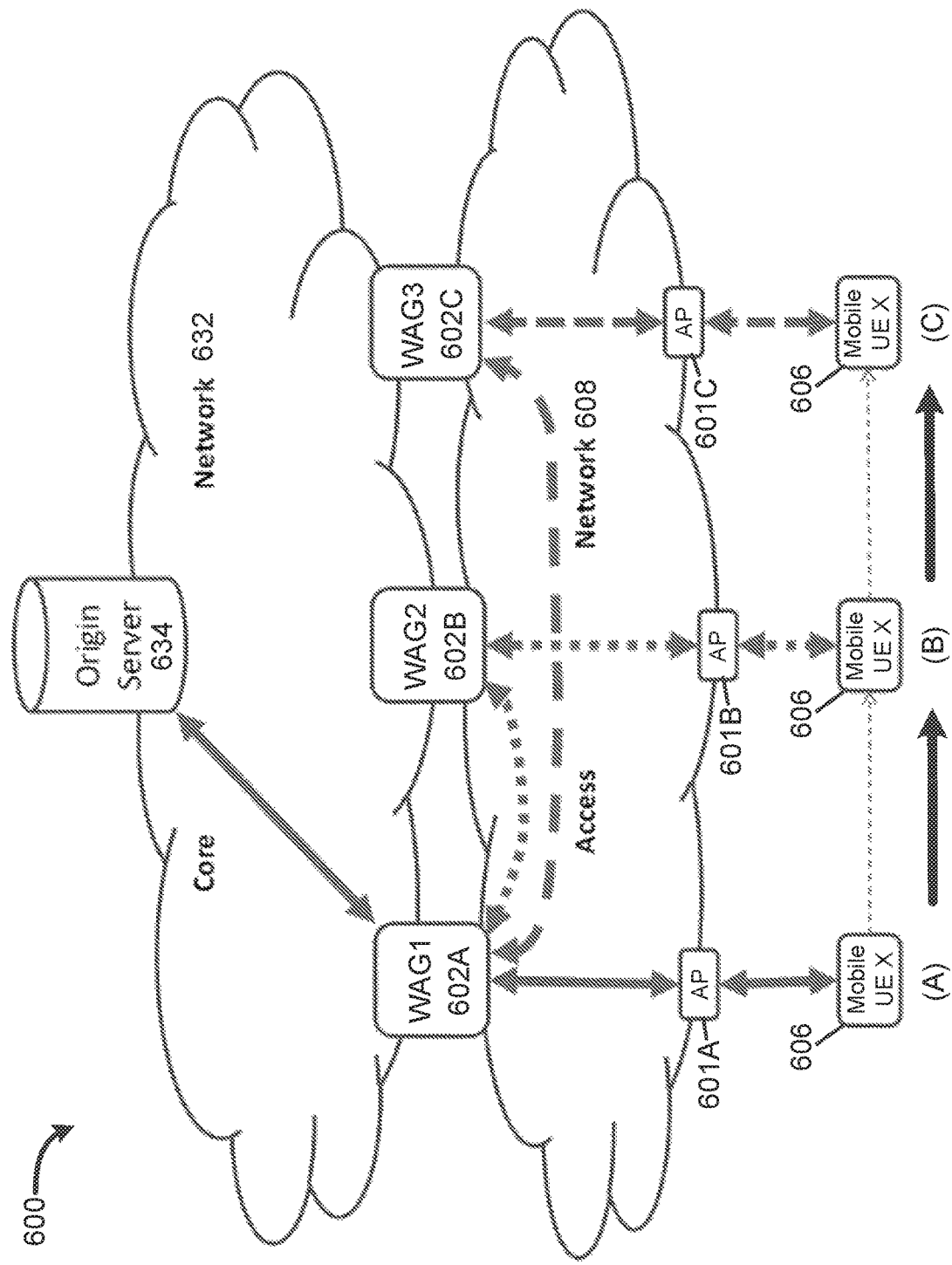
FIG. 6 is a diagram illustrating a method in which WAGs work together to forward UE data from an anchoring WAG to a hosting WAG, allowing for IP Address preservation and seamless movement of the UE, in accordance with some embodiments of the disclosed subject matter.

In some embodiments, as a UE moves from one AP/WAG to another in a manner similar to that described above with reference to FIG. 5, the WAGs work together to forward UE data from the anchoring WAG to the hosting WAG, allowing for IP Address preservation, data flow continuity, and seamless movement of the UE. For example, the method 600 illustrated by the diagram of FIG. 6 shows a mobile UE 606, which connects (at a first time and at a first location, "A") to AP 601A, which is in communication with WAG1 602A (the "anchoring WAG") via access network 608. WAG1 602A, in turn, communicates with an origin server 634 via a core network 632, and one or more data flows are established. Later, the UE 606 moves and connects (at a second time and at a second location, "B") to AP 601B, which is in communication with WAG2 602B (a first "hosting WAG") via the access network 608. WAG2 602B, in turn, communicates with the WAG1 602A within the access network 608 to obtain UE data from WAG1 602A, it being the anchoring WAG. Still later, the UE 606 moves again, and connects (at a third time and at a third location, "C") to AP 601C, which is in communication with WAG3 602C (a second "hosting WAG") via the access network 608. WAG3 602C, in turn, communicates with the WAG1 602A within the access network 608 to obtain UE data from WAG1 602A. This reduces or eliminates the disruption of service normally caused when a UE's IP address is forced to change as the anchor point changes.

Forwarding Tunnel Setup

To forward data from an anchoring WAG to a hosting WAG, a tunnel can be created between the anchoring WAG and the hosting WAG that can be used to tunnel the data across the access network. In one implementation of the present disclosure, GTP is used. However, tunneling technologies such as GRE, MPLS, etc. can be used as well and remain within the scope of the invention.

Figure 7:
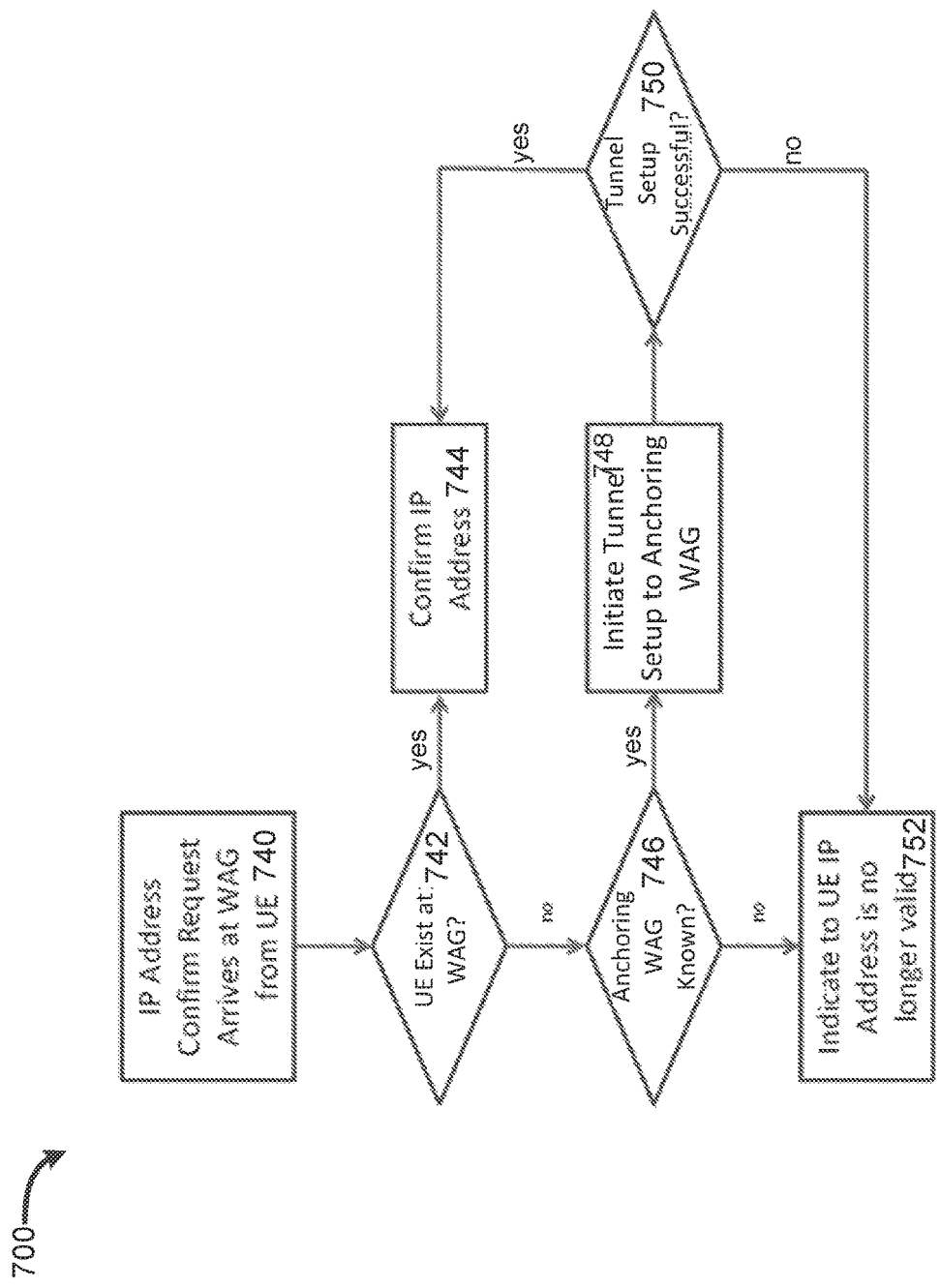
FIG. 7 is a flowchart of a method in which a UE connects to a WAG and attempts to reconfirm a previously allocated IP address, in accordance with some embodiments of the disclosed subject matter.

FIG. 7 is a flowchart of a method in which a UE connects to a WAG (e.g., a hosting WAG) and attempts to reconfirm a previously allocated IP address. In the illustrative example of FIG. 7, it is assumed that the WAGs are interconnected via an IP-based network. The WAGs need not be interconnected using the same access technology that connects APs to WAGs. The method 700 begins with the arrival of an IP Address Confirm Request at a WAG (i.e., a hosting WAG) from an UE (740). The WAG determines, at 742, whether the UE exists on (i.e., is known to) the WAG. If the UE is known to the WAG, the IP address is successfully confirmed at 744. If the UE is not known to the WAG, then the WAG determines whether or not the anchoring WAG for the UE is known (746), e.g., using the techniques described above. If the UE's anchoring WAG's IP information is known to the hosting WAG, the hosting WAG initiates the setup of a tunnel (748) by sending a Create Session Request to the anchoring WAG. Contained in the Create Session Request can be the identity of the UE (IP address) as well as other data that may be required by the anchoring WAG to identify and forward data flows to the hosting WAG (e.g., QoS, bearer information, etc.). The anchoring WAG responds with a Create Session Response, indicating the success/failure of the request.

The result of a successful request is a bi-directional tunnel, e.g., a GTP-U tunnel, between the two WAGs that is used to forward UE user data between the two. This UE user data can correspond to one or more already-existing data flows that were established between the UE and the anchoring WAG when the UE was originally connected to the anchoring WAG. If the GTP tunnel setup is successful at 750, the IP address is successfully confirmed at 744. In some implementations, the anchoring WAG will re-confirm the IP address requested by the UE so that there is no disruption of the IP data flow between the UE and core network resources. From the core network's perspective, all UE data is still sourced and sinked from the anchoring WAG. From the UE's perspective, all UE data is sourced/sinked from the hosting WAG. If the GTP tunnel setup is unsuccessful at 750, the WAG provides an indication to the UE that the IP address for which the UE requested confirmation is no longer valid (752). Likewise, if the anchoring WAG for the UE is not known at 746, the WAG provides an indication to the UE that the IP address for which the UE requested confirmation is no longer valid (752).

Figure 8:
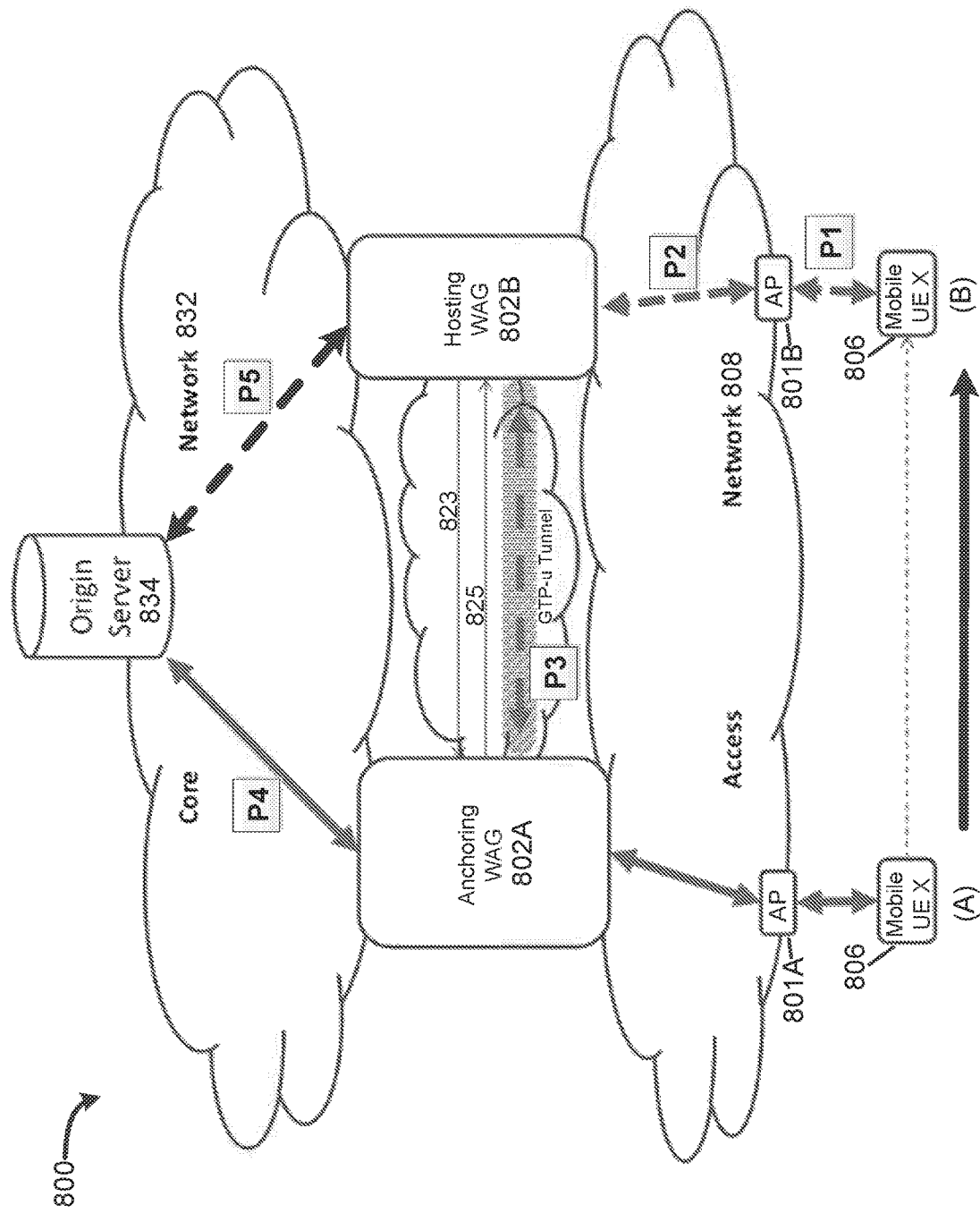
FIG. 8 is a diagram illustrating a method in which a forwarding tunnel is established between an anchoring WAG and a hosting WAG, in accordance with some embodiments of the disclosed subject matter.

FIG. 8 is a diagram illustrating a method in which a forwarding tunnel is established between an anchoring WAG and a hosting WAG, such as may be established at 748 and 750 of FIG. 7, in accordance with some embodiments of the disclosed subject matter. As shown in FIG. 8, a mobile UE 806 is in communication with AP 801A of an access network 808 at a first time. AP 801A establishes a connection to, and communicates with, an anchoring WAG 802A, which communicates with an origin server 834 via a core network 832, for example to establish one or more data flows between the UE 806 and the origin server 834. At a second, subsequent time, mobile UE 806 has moved from its original location ("A") to a new location ("B"), and is no longer communicating with AP 801A, but rather is in communication with AP 801B of the access network 808. AP 801B establishes a connection to, and communicates with, a hosting WAG 802B, which, like anchoring WAG 802A, is capable of communicating with the origin server 834 via the core network 832. When UE 806B attempts to reconfirm a previously allocated IP address, for example by sending an IP Address Confirm Request to the hosting WAG 802B as described above with reference to method 700 of FIG. 7, the hosting WAG 802B may first determine whether the UE 806B is known.

If the UE 806B is known to the hosting WAG 802B, the IP address is successfully confirmed. However, if the UE 806B is not known to the hosting WAG 802B, then the hosting WAG 802B determines whether or not the anchoring WAG for the UE is known. If the UE's anchoring WAG (802A)'s IP information is known to the hosting WAG 802B, the hosting WAG 802B initiates the setup of a GTP-u tunnel with the anchoring WAG 802A by sending a Create Session Request to the anchoring WAG 802A. As discussed above, the Create Session Request can contain the identity of the UE 806B (i.e., its IP address) as well as other data that may be required by the anchoring WAG 802A to identify and forward data flows to the hosting WAG 802B (e.g., QoS, bearer information, etc.). The anchoring WAG 802A responds with a Create Session Response that indicates the success/failure of the request. In FIG. 8, 823 represents a GTP-c Create Session Request, and 825 represents a GTP-c Create Session Response. The result of a successful request is a bi-directional GTP-u tunnel between the hosting WAG 802B and the anchoring WAG 802A, and the tunnel can be used to forward UE user data therebetween (i.e., along bidirectional path P1-P2-P3-P4, as shown in FIG. 8). This forwarded UE user data can include data corresponding to the one or more data flows previously established between the UE 806 and the origin server 834 via the anchoring WAG 802A at the first time and at location A (i.e., prior to the movement of UE 806 to location B at the second time). In some implementations, the anchoring WAG 802A will reconfirm the IP address requested by the UE 806B so that there is no disruption of the IP data flow between the UE 806B and core network resources.

In some embodiments, if UE 806 initiates a new data flow after UE 806 has moved to location B, that new data flow can be routed directly to the origin server 834 from the hosting WAG 802B, via the core network 832, without tunneling to anchoring WAG 802A. The new data flow would then be routed along bidirectional path P1-P2-P5, as shown in FIG. 8, and WAG 802B would be the anchoring WAG for the new data flows.

In some embodiments, after the UE 806 has moved to hosting WAG 802B from the initial anchoring WAG 802A, and all data flows that involved the anchoring WAG 802A have ended, the hosting WAG 802B may cease to communicate with the anchoring WAG 802A, and may itself become a new anchoring WAG for UE 806 going forward.

UE Data Transfer/Forwarding

Figure 9:
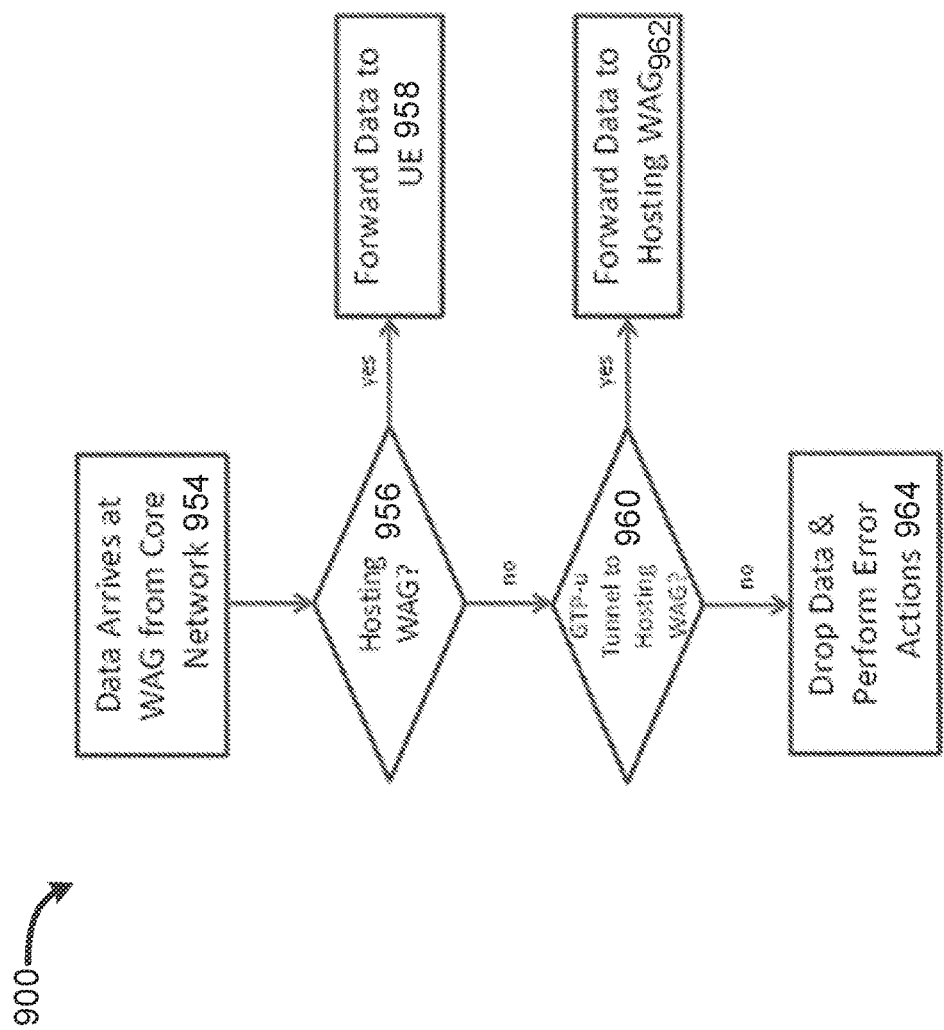
FIG. 9 is a flowchart of a method in which data destined for a UE arrives at a WAG from a core network, in accordance with some embodiments of the disclosed subject matter.

FIG. 9 is a flowchart of a method in which data destined for a UE arrives at a WAG from a core network, in accordance with some embodiments of the disclosed subject matter. As shown in FIG. 9, a method 900 begins with the arrival of data at a WAG from a core network 954. At 956, a determination is made (e.g., based upon the destination IP address) as to whether the recipient WAG is presently the hosting WAG. If the recipient WAG is presently the hosting WAG, then the data received at said WAG is forwarded directly to the UE, which it is already in communication with via an AP (958). If, on the other hand, the recipient WAG is not presently the hosting WAG (e.g., the recipient WAG is the anchoring WAG), then the recipient WAG determines whether a GTP-u tunnel has been established between itself and the hosting WAG (960), again, based on the destination IP address. If a GTP-u tunnel has been established between itself and the hosting WAG, the recipient WAG forwards the received data to the hosting WAG (962). If a GTP-u tunnel has not been established between itself and the hosting WAG, the recipient WAG ultimately drops the received data and performs error actions (964) after a period during which the recipient WAG buffers the packets while awaiting establishment of the needed tunnel.

Figure 10:
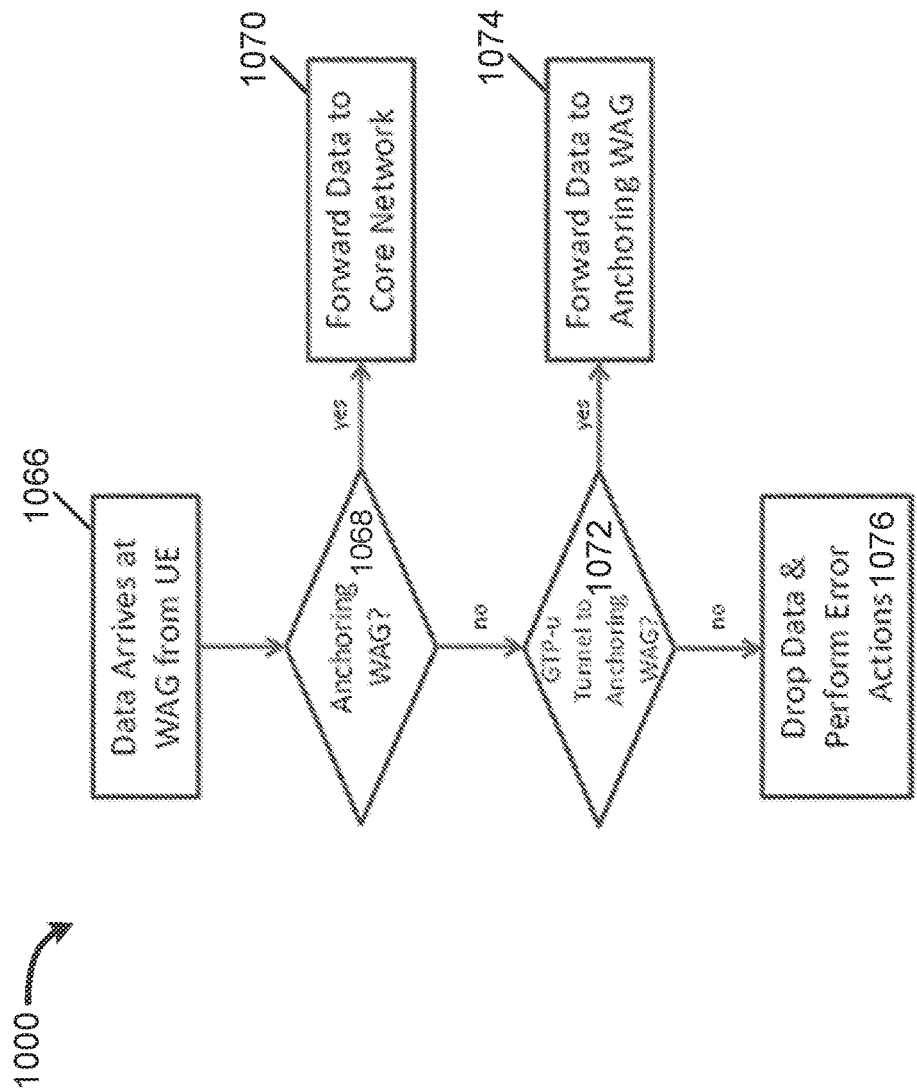
FIG. 10 is Flowchart showing logic at WAG when data arrives from a UE destined for a core network resource, in accordance with some embodiments of the disclosed subject matter.

FIG. 10 is a flowchart showing the logic followed at a WAG when data arrives from a UE destined for a core network resource, in accordance with some embodiments of the disclosed subject matter. As shown in FIG. 10, a method 1000 begins with the arrival of data at a WAG from a UE (1066). At 1068, a determination is made (e.g., based upon the source or destination IP address) as to whether the recipient WAG is presently the anchoring WAG. If the recipient WAG is presently the anchoring WAG, then the data received at said WAG is forwarded directly to the core network (1070). If, on the other hand, the recipient WAG is not presently the anchoring WAG (e.g., the recipient WAG is a hosting WAG), then the recipient WAG determines whether a GTP-u tunnel has been established between itself and the anchoring WAG (1072), again, based on the source or destination IP address. If a GTP-u tunnel has been established between itself and the anchoring WAG, the recipient WAG forwards the received data to the anchoring WAG (1074). If a GTP-u tunnel has not been established between itself and the anchoring WAG, the recipient WAG drops the received data and performs error actions (1076).

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

What is claimed is:

1. A method of data communication between an access network and a core network, the method comprising:
  receiving, by a first wireless access gateway (WAG) in the access network, a first data packet corresponding to a first data flow transmitted from a user equipment (UE), wherein the access network resides outside of the core network, and wherein the core network is a central part of a mobile network to which the first WAG provides direct connectivity;
  forwarding, by the first WAG, the first data packet to the core network;
  receiving, by a second WAG in the access network, a second data packet transmitted from the UE;
  in response to receiving the second data packet, the second WAG determining an identity of the first WAG;

in response to determining the identity of the first WAG, establishing a GPRS Tunneling Protocol (GTP) tunnel connection between the first WAG and the second WAG;

after establishing the GTP tunnel connection, receiving by the second WAG a third data packet corresponding to the first data flow transmitted from the UE;

transmitting, by the second WAG to the first WAG via the GTP tunnel connection, the third data packet; and forwarding, by the first WAG, the third data packet to the core network.

2. The method of claim 1, wherein the second data packet corresponds to the first data flow.

3. The method of claim 1, wherein the second data packet corresponds to a request by the UE for confirmation that an Internet Protocol (IP) address presently assigned to the UE can still be used to conduct the first data flow.

4. The method of claim 3, further comprising the second WAG transmitting a response to the UE request, the response comprising confirmation that the UE can continue to use the IP address presently assigned to the UE.

5. The method of claim 1, further comprising:
receiving a fourth data packet at the first WAG, the fourth data packet being received from the core network, the fourth data packet corresponding to the first data flow intended for the UE;
the first WAG transmitting the fourth data packet to the second WAG via the GTP tunnel connection; and
the second WAG transmitting the fourth data packet to the UE.

6. The method of claim 5, wherein:
the fourth data packet is transmitted by an origin server to the first WAG via the core network; and
the method further comprises the first WAG performing a network address translation operation on the fourth data packet before transmitting the fourth data packet to the second WAG.

7. The method of claim 1, further comprising transmitting user data associated with the UE via the GTP tunnel connection.

8. The method of claim 1, further comprising the second WAG inspecting the second data packet to determine whether the second data packet is part of an existing data flow or part of a new data flow.

9. The method of claim 1, wherein the second WAG determining the identity of the first WAG comprises the second WAG receiving the identity of the first WAG from a Wireless Authentication, Authorization, and Accounting Proxy (WAP).

10. The method of claim 9, wherein:
the second WAG receives the identity of the first WAG from the WAP in response to the second WAG requesting the identity of the first WAG from the WAP; and
the second WAG requests the identity of the first WAG from the WAP in response to the second WAG receiving the second data packet.

11. The method of claim 9, wherein the second WAG receives the identity of the first WAG from the WAP in response to the UE transmitting a re-authentication request to the WAP.

12. The method of claim 1, wherein the second WAG determining the identity of the first WAG comprises the second WAG inspecting an IP address of the UE and determining the identity of the first WAG based on the IP address of the UE.

13. The method of claim 1, further comprising:
receiving, by the second WAG, a fourth data packet corresponding to a second data flow transmitted from the UE; and
the second WAG transmitting the fourth data packet to a computer system while bypassing the GTP tunnel connection.

14. A method of data communication between an access network and a core network, the method comprising:
receiving, by a first wireless access gateway (WAG) in the access network, a first data packet corresponding to a first data flow transmitted by a computer system in the core network, the first data flow being intended for a user equipment (UE), wherein the access network resides outside of the core network, and wherein the core network is a central part of a mobile network to which the first WAG provides direct connectivity;
the first WAG transmitting the first data packet to the UE;
a second WAG receiving, from the UE, a request by the UE for confirmation that an Internet Protocol (IP) address presently assigned to the UE can still be used for the first data flow, the request being received by the second WAG after the UE moves from a first location corresponding to the first WAG to a second location corresponding to the second WAG;
the second WAG determining an identity of the first WAG in the access network in response to the second WAG receiving the request;
in response to determining the identity of the first WAG, establishing a GPRS Tunneling Protocol (GTP) tunnel connection between the first WAG and the second WAG;
after establishing the GTP tunnel connection, receiving by the first WAG a second data packet corresponding to the first data flow;
the first WAG transmitting to the second WAG, via the GTP tunnel connection, the second data packet; and
the second WAG transmitting the second data packet over the access network to the UE.

15. The method of claim 14, wherein the second WAG determines the identity of the first WAG in response to the second WAG determining that the UE is inaccessible via the second WAG.

16. The method of claim 14, wherein the second WAG determining the identity of the first WAG comprises the second WAG receiving the identity of the first WAG from a Wireless Authentication, Authorization, and Accounting Proxy (WAP).

17. The method of claim 16, wherein the second WAG receives the identity of the first WAG from the WAP in response to the second WAG requesting the identity of the first WAG from the WAP.

18. The method of claim 16, wherein the second WAG receives the identity of the first WAG from the WAP in response to the UE transmitting an authentication request to the WAP.

19. A method of selectively routing data communications between an access network and a packet data network and between the access network and a wireless operator core network, comprising:
providing a wireless access gateway (WAG) with network connectivity to the access network, the wireless operator core network, and the packet data network, wherein the packet data network resides outside of the wireless operator core network, and wherein the wireless operator core network is a central part of a mobile network to which the WAG provides direct connectivity;

receiving by the WAG via the access network a first data packet intended for a first computer system included in the wireless operator core network, the first data packet comprising a source address and a destination address;

selectively routing, by the WAG, the first data packet to the first computer system via the wireless operator core network;

receiving by the WAG via the access network a second data packet intended for a second computer system included in the packet data network, the second data packet comprising the source address and the destination address; and selectively routing, by the WAG, the second data packet to the second computer system via the packet data network while bypassing the wireless operator core network.

20. The method of claim 19, wherein the first data packet is selectively routed to the first computer system based on at least one of:

a source Internet Protocol (IP) address;

a source User Datagram Protocol/Transmission Control Protocol (UDP/TCP) port;

a destination IP address;

a destination UDP/TCP port; or a traffic type of the first data packet or the second data packet.

* * * * *